United States Patent
Kupershmidt et al.

(10) Patent No.: US 11,847,089 B2
(45) Date of Patent: Dec. 19, 2023

(54) ELECTRONIC DEVICE AND METHOD FOR SHARING DATA LANES OF A NETWORK INTERFACE DEVICE BETWEEN TWO OR MORE COMPUTING DEVICES

(71) Applicant: Mellanox Technologies Ltd., Yokneam (IL)

(72) Inventors: Haim Kupershmidt, Yokneam (IL); Ortal Bashan, Yokneam (IL); Avi Ganor, Yokneam (IL); Roman Meltser, Yokneam (IL); Tom Munk, Yokneam (IL); Doron Fael, Yokneam (IL); Dvir Edry, Yokneam (IL); Hamza Marie, Yokneam (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 0 days.

(21) Appl. No.: 17/730,628

(22) Filed: Apr. 27, 2022

(65) Prior Publication Data
US 2023/0350836 A1    Nov. 2, 2023

(51) Int. Cl.
*G06F 13/42* (2006.01)

(52) U.S. Cl.
CPC .. *G06F 13/4282* (2013.01); *G06F 2213/0016* (2013.01)

(58) Field of Classification Search
CPC .................. G06F 13/4282; G06F 2213/0016
See application file for complete search history.

(56) References Cited

U.S. PATENT DOCUMENTS

| | | | | |
|---|---|---|---|---|
| 7,426,597 B1* | 9/2008 | Tsu | ...................... | G06F 13/4018 710/29 |
| 7,626,418 B1* | 12/2009 | Kolze | .............. | H03K 19/17732 326/39 |
| 8,917,111 B1* | 12/2014 | Puranik | ............ | H03K 19/17748 326/38 |
| 9,690,741 B2* | 6/2017 | Venkata | .............. | G06F 13/4068 |
| 10,176,128 B2* | 1/2019 | Hildebrand | ......... | G06F 13/4282 |
| 10,747,697 B2* | 8/2020 | Kwak | .................... | G06F 13/124 |
| 11,528,187 B1* | 12/2022 | Volpe | .................. | H04L 41/0816 |
| 2014/0016479 A1* | 1/2014 | Coomber | ................. | H04L 43/50 370/252 |
| 2015/0370735 A1* | 12/2015 | Pitigoi-Aron | ......... | G06F 13/364 710/110 |
| 2021/0109300 A1* | 4/2021 | Wagh | .................. | H03M 7/3086 |

* cited by examiner

*Primary Examiner* — Henry Tsai
*Assistant Examiner* — Christopher A Daley
(74) *Attorney, Agent, or Firm* — PEARL COHEN ZEDEK LATZER BARATZ LLP (57) ABSTRACT

An electronic device connectable to a network interface device having a plurality of signal lanes may include a first computing device, a second computing device, and an interface to connect the first computing device to a first subset of signal lanes of the plurality of data lanes of the network interface device and connect the second computing device to a second subset of data lanes of the plurality of data lanes of the network computing device.

16 Claims, 4 Drawing Sheets

ELECTRONIC DEVICE AND METHOD FOR SHARING DATA LANES OF A NETWORK INTERFACE DEVICE BETWEEN TWO OR MORE COMPUTING DEVICES

FIELD OF THE INVENTION

The present invention relates to the field of computer networks, and more particularly, to network devices.

BACKGROUND OF THE INVENTION

In prior art network devices, a processor (such as, e.g. network interface controller) connected to a network interface device (e.g. such as small form factor pluggable (SFP) device) typically receives all data lanes of that network interface device. Typically, processors used in prior art network devices may process up to 400 gigabits per second of data while some of current network interface devices may transmit data at up to 800 gigabits per second. Such an architecture of prior art network devices is not optimal with respect to data processing capabilities of prior art network devices because the processors used in prior art network devices are typically capable of processing data at lower rates than transmission rates of the network interface devices.

SUMMARY OF THE INVENTION

Embodiments of the invention may provide an electronic device connectable to a network interface device having a plurality of data lanes, where the electronic device may include a first computing device, a second computing device, and an interface to connect the first computing device to a first subset of data lanes of the plurality of data lanes of the network interface device and connect the second computing device to a second subset of data lanes of the plurality of data lanes of the network computing device. The first computing device may manage operation of the network interface device. The first computing device may manage operation of the network interface device on behalf of the second computing device based on a set of rules. The first computing device may transmit to the second computing device notifications (e.g. unsolicited notifications) related to operation of the network interface device. In some embodiments, each of the first computing device and the second computing device may alternately manage operation of the network interface device on its own behalf and further manage operation of the network interface device on behalf of the other computing device.

Embodiments of the invention include an electronic device connectable to a network interface device having a plurality of data lanes, where the electronic device may include a first computing device, a second computing device in communication with the first computing device, and an interface in communication with the first computing device, the interface to connect the first computing device to a first subset of data lanes of the plurality of data lanes of the network interface device, connect the second computing device to a second subset of data lanes of the plurality of data lanes of the network interface device, and manage operation of the network interface device based on instructions received from the first computing device. The first computing device may receive from the second computing device a request related to management of the network interface device, and based on a set of rules, determine whether or not the request is valid. If the first computing device determines that the request is valid, the first computing device may, based on the request, generate instructions related to management of the network interface device, and transmit the generated instructions to the interface so as to manage operation of the network interface device on behalf of the second computing device. If the first computing device determines that the request is not valid, the first computing device may deny the request, and transmit a respective notification to the second computing device. The first computing device may transmit to the second computing device notifications (e.g. unsolicited notifications) related to operation of the network interface device.

Embodiments include a method of operating an electronic device connectable to a network interface device, the method may include, by a first computing device connected to a first subset of a plurality of data lanes of the network interface device, managing operation of the network interface device on behalf of a second computing device connected to a second subset of the plurality of data lanes of the network interface device.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention provide an electronic device (e.g. a network switch device) that may include a first computing device (e.g. a first application specific integrated circuit (ASIC) chip), a second computing device (e.g. a second ASIC chip) and an interface to connect to a network interface device having a plurality of signal lanes (e.g. a form factor device such as a small form factor pluggable device). The interface may connect the first computing device to a first subset of the signal lanes of the network interface deice and connect the second computing device to a second subset of the signal lanes of the network interface device when the network interface device is connected to the interface. The first computing device may be in communication with the interface to manage operation of the network interface device (e.g. as described herein). The first computing device may be in communication with the second computing device and may further manage the network interface device on behalf of the second computing device (e.g. as described herein).

Embodiments of the invention may increase data processing bandwidth of the electronic device (such as network device) as compared to prior art electronic devices. Sharing data lanes of a single network interface device (that can transmit data at up to, e.g. 800 gigabits per second) between two or more computing devices (such as ASIC chips that can each process of up to, e.g. 400 gigabits per second of data) may optimize utilization of the data transmission capabilities of the network interface device by the electronic device. This in contrast to prior art electronic devices (such as network switch devices) in which only one computing device (such as ASIC chip) is connected to all data lanes of a particular network interface device, which may result in sub-optimal utilization of the data transmission capabilities of that network interface device.

Embodiments of the invention may provide smaller and more compact electronic device as compared to prior art electronic devices. For example, optimizing utilization of the data transmission capabilities of the network interface device by the electronic device (e.g. as described herein) may enable using one fast network interface device (that can transmit data at up to, e.g. 800 gigabits per second) instead of two or more slower network interface devices (that each can transmit data at up to, e.g. 400 gigabits per second). Accordingly, the electronic device may include less components on its printed circuit board and/or may have smaller dimensions as compared to prior art electronic devices.

Figure 1:
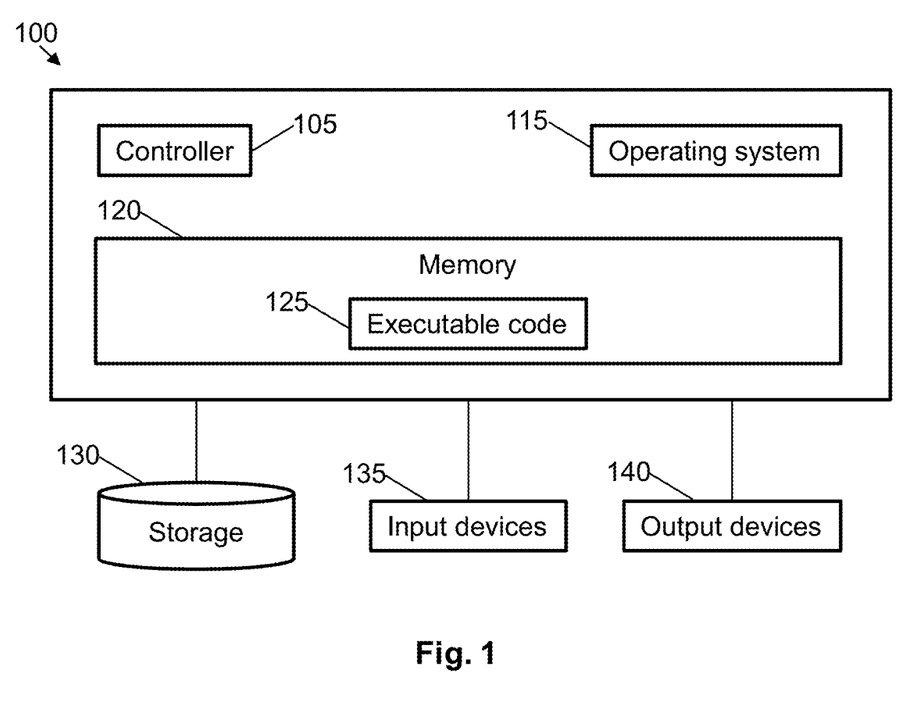
FIG. 1 is a block diagram of an exemplary computing device which may be used with embodiments of the present invention.

Reference is now made to FIG. 1, which is a block diagram of an exemplary computing device which may be used with embodiments of the present invention. The computing device shown in FIG. 1, or elements of the computing device such as a processor or memory, may be used as or with the various components shown in FIGS. 2 and 3 and/or may be used to carry out methods according to the present invention.

Computing device 100 may include a controller or processor 105 that may be, for example, a central processing unit processor (CPU), a chip or any suitable computing or computational device, an operating system 115, a memory 120, a storage 130, input devices 135 and output devices 140.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different, memory units. Memory 120 may store for example, instructions to carry out a method (e.g. code 125), and/or data such as user responses, interruptions, etc.

Executable code 125 may be any executable code, e.g. an application, a program, a process, task or script. Executable code 125 may be executed by controller 105 possibly under control of operating system 115. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card, a modem, printer or facsimile machine, a universal serial bus (USB) device or external hard drive may be included in input devices 135 and/or output devices 140.

Embodiments of the invention may include one or more articles (e.g. memory 120 or storage 130) such as a computer or processor non-transitory readable medium, or a computer or processor non-transitory storage medium, such as for example a memory, a disk drive, or a USB flash memory, encoding, including or storing instructions, e.g. computer-executable instructions, which, when executed by a processor or controller, carry out methods disclosed herein.

Figure 2:
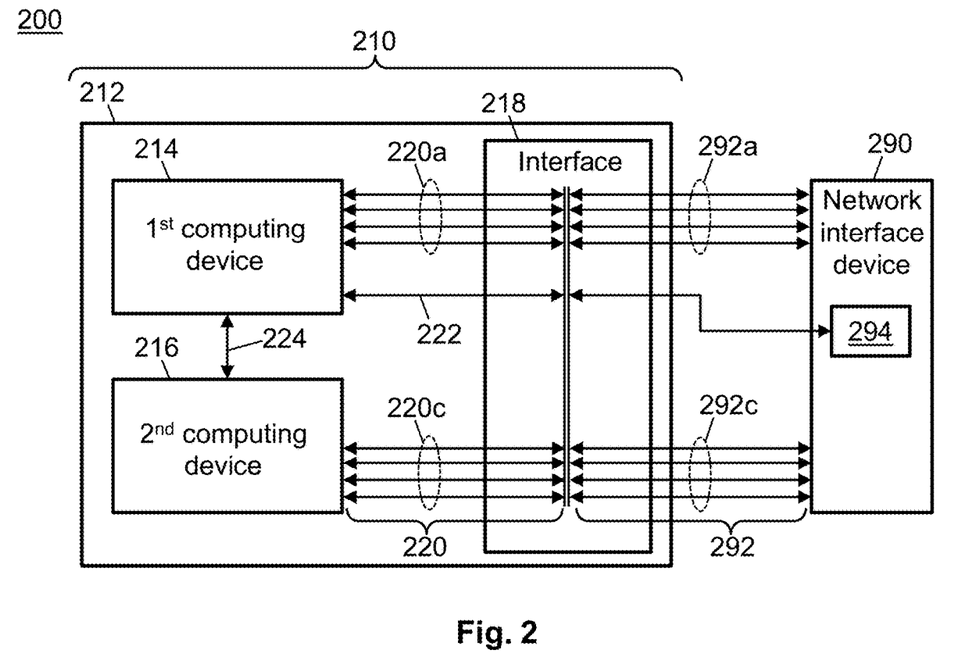
FIG. 2 is a block diagram of a system including an electronic device having two computing devices sharing data lanes of the same network interface device, according to some embodiments of the invention.

Reference is now made to FIG. 2, which is a block diagram of a system 200 including an electronic device 210 having two computing devices sharing data lanes 292 of the same network interface device 290, according to some embodiments of the invention.

Electronic device 210 may include a printed circuit board (PCB) 212, a first computing device 214 disposed on PCB 212, and a second computing device 216 disposed on PCB 212. Each of first computing device 214 and second computing device 216 may be or may include, e.g. an application specific integrated circuit (ASIC) chip. For example, electronic device 210 may be a network device (e.g. a host channel adapter (HCA) or network switch device or any other device with fast network interface known in the art), and first computing device 214 and second computing device 216 may each be a network interface controller (NIC) device or a network switch device. Electronic devices other than network devices and computing devices other than NIC devices may be configured to carry out embodiments of the invention. While two computing devices 214, 216 are shown and described, electronic device 210 may include three or more computing devices.

Electronic device 210 may include an interface 218 disposed on PCB 212. Interface 218 may connect to a network interface device 290. Network interface device 290 may be, for example, an SFP device such as a quad SFP (QSFP) device or an octal SFP (OSFP) device or any other SFP device having two or more data lanes known in the art. Network interface device 290 may include a plurality of data lanes 292. In the example of FIG. 2, network interface device 290 includes eight (8) data lanes 292. However, network interface device 290 may include various numbers of data lanes 292. In some embodiments, network interface device 290 may include a management module 294. Management module 294 may manage operation of network interface device 290 when network interface device 290 is connected to interface 218. Management module 294 may manage operation of network interface device 290 based on, e.g. instructions received from first computing device 214 and/or second computing device 216 via interface 218 (e.g. as described herein). While management module 294 is described herein as being part of network interface device 290, in some embodiments, management module 294 may be external to network interface device 290.

Interface 218 may connect first computing device 214 to a first subset 292a of data lanes 292 of network interface device 290. Interface 218 may connect second computing device 216 to a second subset 292c of data lanes 292 of network interface device 290. For example, electronic device 210 may include data lanes 220 positioned on PCB 212 (e.g. as shown in FIG. 2). A first subset 220a of data lanes 220 may extend between first computing device 214 and interface 218 and connect first computing device 214 to first subset 292a of data lanes 292 of network interface device 290 when network interface device 290 is connected to interface 218 (e.g. as shown in FIG. 2). A second subset 220c of data lanes 220 may extend between second computing device 216 and interface 218 and connect second computing device 216 to second subset 292c of data lanes 292 of network interface device 290 when network interface device 290 is connected to interface 218 (e.g. as shown in FIG. 2).

In the example of FIG. 2, each of data lanes 220 connects one of data lanes 292 of network interface device 290 to one of computing devices 214, 216. However, in some embodiments, electronic device 210 may include an additional (e.g. third) subset of data lanes that is not connected to none of computing devices 214, 216 (not shown).

In operation, one of first computing device 214 or second computing device 216 may operate as a primary computing device that communicates (e.g. directly communicates) with interface 218 and manages operation of network interface device 290 (e.g. via interface 218 or management module 294). Another computing device of first computing device 214 or second computing device 216 may operate as a secondary computing device that is in communication (e.g. direct communication) with the primary computing device, wherein the primary computing device may further manage operation of network computing device 290 (e.g. via management module 294) on behalf of the secondary computing device. At each time, only one of first computing device 214 or second computing device 216 may operate as a primary computing device. In some embodiments, first computing device 214 may permanently operate as a primary computing device (e.g. as described below with respect to FIG. 2). In some embodiments, each of first computing device 214 and second computing device 216 may alternately operate as the primary computing device (e.g. as described above with respect to FIG. 3).

In the example of FIG. 2, first computing device 214 permanently operates as a primary computing device. First computing device 214 may be in communication (e.g. direct communication) with interface 218. For example, electronic device 210 may include a communication channel 222 (e.g. such as $I^2C$ bus or any other communication channel known in the art) disposed on PCB 212 and extending between first computing device 214 and interface 218 (e.g. as shown in FIG. 2). First computing device 214 may manage operation of network interface device 290 (e.g. via communication channel 222 and interface 218) when network interface device 290 is connected to interface 218.

For example, first computing device 214 may transmit to interface 218 instructions related to management of network interface device 290. Interface 218 may manage operation of network interface device 290 (e.g. via management module 294 of network interface device 290) based on the instructions received from first computing device 214. First computing device 214 may transmit to second computing device 216 notifications related to management and/or operation of network interface device 290.

In the example of FIG. 2, second computing device 216 permanently operates as a secondary computing device. Second computing device 216 may be in communication (e.g. direct communication) with first computing device 214, and first computing device 214 may further manage operation of network interface device 290 on behalf of second computing device 216. Communication between first computing device 214 and second computing device 216 may be, for example, via a communication channel 224 (e.g. such as $I^2C$ bus or any other communication channel known in the art) disposed on PCB 212 and extending between second computing device 216 and first computing device 214 (e.g. as shown in FIG. 2). Other examples of communication channel 222 and/or communication channel 224 may include controller-target $I^2C$ bus, single-master $I^2C$ bus (e.g. optionally with an interrupt), management data input/input (MDIO), Ethernet channel, universal serial bus (USB) near-field communication (NFC) or any other component known in the art.

Second computing device 216 may, for example, transmit to first computing device 214 a request related to management of network interface device 290. First computing device 214 may determine, e.g. based on a set of rules (e.g. predefined set of rules), whether or not the request received from the second computing device 216 is valid. If first computing device 214 determines that the request is valid, first computing device 214 may generate instructions based on the request and transmit the generated instructions to interface 218 so as to manage operation of network interface device 290 on behalf of, e.g. in response to a request from, second computing device 216. If first computing device 214 determines that the request is not valid, first computing device 214 may ignore or deny the request. If the request is ignored or denied, first computing device 214 may transmit respective notification to second computing device 216. For example, if second computing device 216 sends to first computing device 214 a request to disable one of data lanes of first subset 292a used by first computing device 214, first computing device 214 may ignore or deny the request and transmit respective notification to second computing device 216.

First computing device 214 may transmit to second computing device 216 notifications (e.g. unsolicited notifications) related to operation of network interface device 290. Such notifications may, for example, include indication of "plug in" or "unplug" event of network interface device 290, loss of signal on one of data lanes 292 of network interface device 290 or any other event related to operation network interface device 290.

The description below provides examples of management of operation of network interface device 290 by first computing device 214 and/or management of operation of network interface device 290 by first computing device 214 on behalf of second computing device 216 and based on the set of rules.

One example may include management of operation of network interface device 290 by first computing device 214 on its own behalf and/or on behalf of second computing device 216 in the case when network interface device 290 needs to reset. If a request to reset network interface device 290 is received at first (e.g. primary) computing device 214, first (e.g. primary) computing device 214 may deactivate data lanes of first subset 292a and transmit to second (e.g. secondary) computing device 216 a notification indicating that network interface device 290 needs to be reset. Upon receipt of the notification, second (e.g. secondary) computing device 216 may deactivate data lanes of second subset 292c and transmit to first (e.g. primary) computing device 214 a notification indicating that second (e.g. secondary) computing device 216 is ready for reset network interface device 290. Upon receipt of the notification, first (e.g. primary) computing device 214 may transmit to interface 218 instructions to reset network interface device 290. When reset of network interface device 290 is complete, first (e.g. primary) computing device 214 may activate data lanes of first subset 292a and transmit to second (e.g. secondary) computing device 216 a respective notification. Upon receipt of the notification, second (e.g. secondary) computing device 216 may activate data lanes of second subset 292c of network interface device 290. If a request to reset network interface device 290 is received at second (e.g. secondary) computing device 216, second computing device 216 may deactivate data lanes of second subset 292c and transmit to first (e.g. primary) computing device 214 a notification indicating that network interface device 290 needs to be reset. Upon receipt of the notification, first (e.g. primary) computing device 214 may deactivate data lanes of first subset 292a and transmit to interface 218 instructions to reset network interface device 290. When reset of network interface device 290 is complete, first (e.g. primary) computing device 214 may activate data lanes of first subset 292a and transmit to second (e.g. secondary) device 216 a respective notification. Upon receipt of the notification, second (e.g. secondary) computing device 216 may activate data lanes of second subset 292c of network interface device 290.

Another example may include management of operation of network interface device 290 by first computing device 214 on its own behalf and/or on behalf of second computing device 216 in the case of loss of signal on one of data lanes 292 of network interface device 290. First (e.g. primary) computing device 214 may detect a loss of signal on one of data lanes 292 of network interface device 290. If first (e.g. primary) computing device 214 detects that the loss of signal is on one of data lanes of first subset 292a connected to first (e.g. primary) computing device 214, first (e.g. primary) computing device 214 may perform an action to recover the signal on that signal lane. If first (e.g. primary) computing device 214 detects that the loss of signal is on one of data lanes of second subset 292c connected to second (e.g. primary) computing device 216, first (e.g. primary) computing device 214 may transmit to second (e.g. secondary) computing device 216 a respective notification. Upon receipt of the notification, second (e.g. secondary) computing device 216 may transmit to first (e.g. primary) computing device 214 a request to recover the signal on the signal lane. Upon receipt of the request, first (e.g. primary) computing device 214 may perform an action to recover the signal on the signal lane, and when the signal is recovered transmit to second (e.g. secondary) computing device 216 a respective notification.

Other examples of management of operation of network interface device 290 by first computing device 214 and/or management of operation of network interface device 290 by first computing device 214 on behalf of second computing device 216 are also possible. Other examples may, e.g. include any event related to operation of network interface device 290 as defined by specifications (e.g. CMIS specifications) of network interface device 290.

Figure 3:
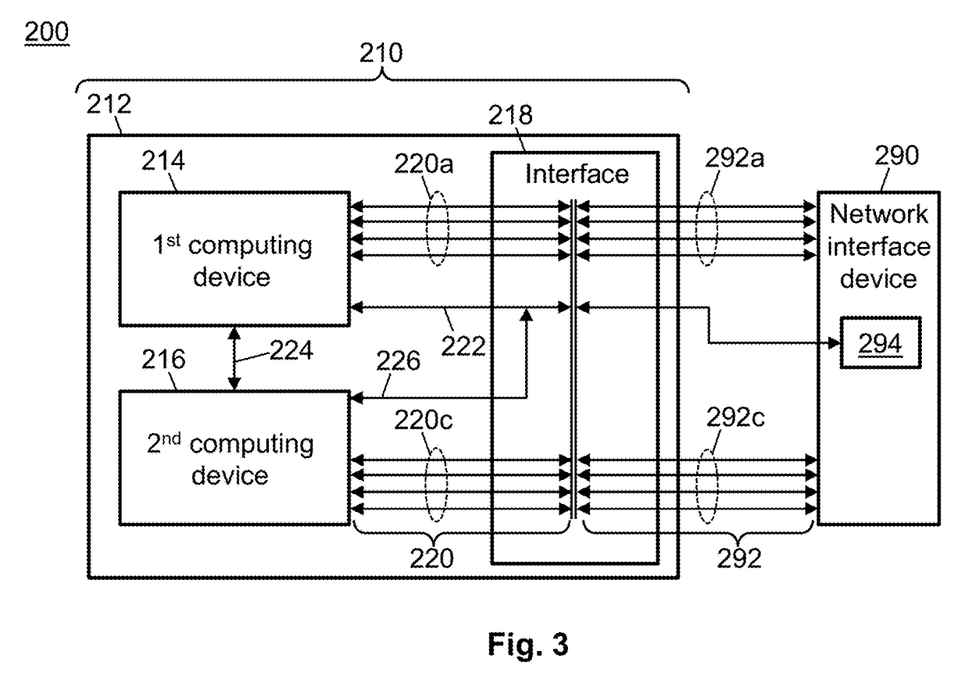
FIG. 3 is a block diagram of the system including the electronic device having two computing devices sharing data lanes of the same network interface device, wherein each of the computing devices can alternately operate as a primary computing device, according to some embodiments of the invention.

Reference is now made to FIG. 3, which is a block diagram of system 200 including electronic device 210 having two computing devices sharing data lanes 292 of the same network interface device 290, wherein each of the computing devices can alternately operate as a primary computing device, according to some embodiments of the invention.

In the example of FIG. 3, each of first computing device 214 and second computing device 216 may alternately operate as a primary computing device managing the operation of network interface device 290 on its own and on behalf of a secondary computing device (e.g. as described above with respect to FIG. 2). In this example, in addition to first computing device 214, second computing device 216 may also be in communication (e.g. direct communication) with interface 218, for example via a communication channel 226 (e.g. such as such as I²C bus or any other communication bus known in the art) disposed on PCB 212 and extending between second computing device 216 and interface 218. In operation, only one of first computing device 214 and second computing device 216 may operate as a primary computing device at each time. For example, if first computing device 214 operates as a primary computing device at a particular time, second computing device 216 operates as a secondary computing device at that particular time.

Switching between the primary computing device and the secondary computing device may be triggered or caused by one or more events related to operation of the primary computing device and/or the secondary computing device.

One example may include switching between the primary computing device and the secondary computing device in the case when the primary computing device needs to reset. In this example, the primary computing device may transmit to the secondary computing device a notification indicating that the primary computing device need to reset. Upon receipt of the notification, the secondary computing device may start operating as the primary computing device, e.g. until the reset of the other computing device is complete.

Another example may include switching between the primary computing device and the secondary computing device in the case when firmware of the primary computing device is frozen. In this example, the secondary computing device may determine that the primary computing device is frozen and start operating as the primary computing device, e.g. until a notification indication that the other computing device, e.g. until the operation of the other computing device is back to its normal state.

Other examples of cases that may trigger or cause the switching between the primary computing device and the secondary computing device are possible.

Figure 4:
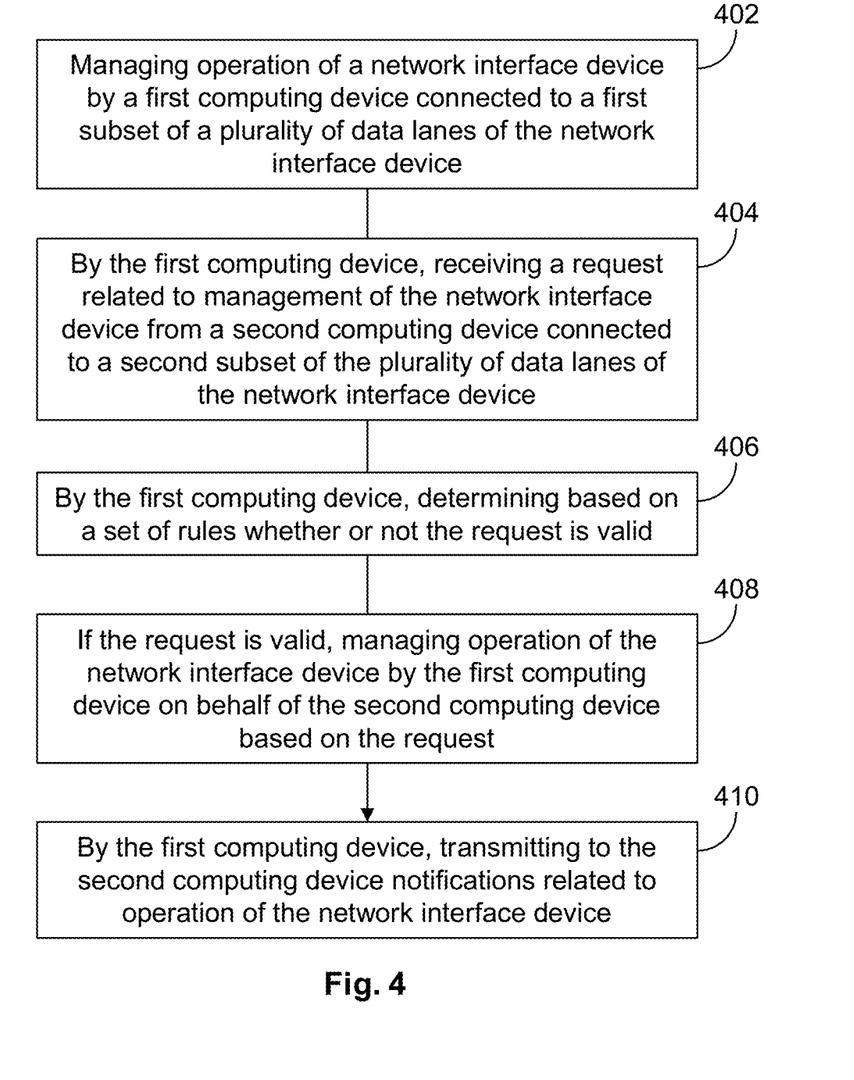
FIG. 4 is a flowchart of a method of operating an electronic device connectable to a network interface device, according to some embodiments of the invention.

Reference is now made to FIG. 4, which is a flowchart of a method of operating an electronic device connectable to a network interface device, according to some embodiments of the invention.

The operations of FIG. 4 may be performed using an electronic device, such as electronic device 210 described above with respect to FIG. 2 or FIG. 3, but other systems may be used.

In operation 402, an operation of a network interface device may be managed by a first computing device connected to a first subset of a plurality of data lanes of the network interface device. For example, the first computing device may be first computing device 214 and the network interface device may be network interface device 290 described above with respect to FIG. 2.

In operation 404, a request related to management of the network interface device may be received by the first computing device from a second computing device connected to a second subset of the plurality of data lanes of the network interface device. For example, the second computing device may be second computing device 216 described above with respect to FIG. 2.

In operation 406, it may be determined by the first computing device based on a set of rules whether or not the request is valid (e.g. as described above with respect to FIG. 2).

In operation 408, if it is determined by the first computing device that the request is valid, the first computing device may manage operation of the network interface device on behalf of the second computing device based on the request (e.g. as described above with respect to FIG. 2).

If it is determined by the first computing device that the request is not valid, the request may be ignored or denied, and a respective notification may be transmitted by the first computing device to the second computing device (e.g. as described above with respect to FIG. 2).

In operation 410, notifications (e.g. unsolicited notifications) related to operation of the network interface device may be transmitted by the first computing device to the second computing device (e.g. as described above with respect to FIG. 2).

Embodiments of the invention may increase data processing bandwidth of the electronic device as compared to prior art electronic devices. Sharing data lanes of a single network interface device between two or more computing devices may optimize utilization of the data transmission capabilities of the network interface device by the electronic device. This in contrast to prior art electronic devices in which only one computing device receives all the data lanes of a particular network interface device, which may result in sub-optimal utilization of the data transmission capabilities of that network interface device.

Embodiments of the invention may provide smaller and more compact electronic device as compared to prior art electronic devices. For example, optimizing utilization of the data transmission capabilities of the network interface device by the electronic device (e.g. as describe herein) may enable using one fast network interface device (that can transmit data at up to, e.g. 800 gigabits per second) instead of two or more slower network interface devices (that each can transmit data at up to, e.g. 400 gigabits per second). Accordingly, the electronic device may include less components on its printed circuit board and/or may have smaller dimensions as compared to prior art electronic devices.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g. electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. An electronic device connectable to a network interface device having a plurality of data lanes, the electronic device comprising:
   a first computing device;
   a second computing device; and
   an interface to:
      connect the first computing device to a first subset of data lanes of the plurality of data lanes of the network interface device, and
      connect the second computing device to a second subset of data lanes of the plurality of data lanes of the network computing device;
   wherein the first computing device is to manage operation of the network interface device on behalf of the second computing device based on a set of rules.

2. The electronic device of claim 1, wherein the first computing device is to manage operation of the network interface device.

3. The electronic device of claim 1, wherein the second computing device is in communication with the first computing device.

4. The electronic device of claim 1, wherein the first computing device is to transmit to the second computing device notifications related to operation of the network interface device.

5. The electronic device of claim 1, wherein each of the first computing device and the second computing device is an application-specific integrated circuit (ASIC) chip.

6. The electronic device of claim 1, wherein the electronic device is a network device and wherein each of the first computing device and the second computing device is one of a network interface controller (NIC) device or a network switch device.

7. The electronic device of claim 1, wherein the network interface device is a small form factor pluggable (SFP) device.

8. An electronic device connectable to a network interface device having a plurality of data lanes, the electronic device comprising:
- a first computing device;
- a second computing device; and
- an interface to:
  - connect the first computing device to a first subset of data lanes of the plurality of data lanes of the network interface device, and
  - connect the second computing device to a second subset of data lanes of the plurality of data lanes of the network computing device;
- wherein each of the first computing device and the second computing device is to alternately manage operation of the network interface device on its own behalf and further to manage operation of the network interface device on behalf of the other computing device.

9. An electronic device connectable to a network interface device having a plurality of data lanes, the electronic device comprising:
- a first computing device;
- a second computing device in communication with the first computing device; and
- an interface in communication with the first computing device, the interface to:
  - connect the first computing device to a first subset of data lanes of the plurality of data lanes of the network interface device,
  - connect the second computing device to a second subset of data lanes of the plurality of data lanes of the network interface device, and
  - manage operation of the network interface device based on instructions received from the first computing device;
- wherein the first computing device is to:
  - receive from the second computing device a request related to management of the network interface device; and
  - based on a set of rules, determine whether or not the request is valid.

10. The electronic device of claim 9, wherein the first computing device is to, if the first computing device determines that the request is valid:
- based on the request, generate instructions related to management of the network interface device; and
- transmit the generated instructions to the interface so as to manage operation of the network interface device on behalf of the second computing device.

11. The electronic device of claim 9, wherein the first computing device is to, if the first computing device determines that the request is not valid:
- deny the request; and
- transmit a respective notification to the second computing device.

12. An electronic device connectable to a network interface device having a plurality of data lanes, the electronic device comprising:
- a first computing device;
- a second computing device in communication with the first computing device; and
- an interface in communication with the first computing device, the interface to:
  - connect the first computing device to a first subset of data lanes of the plurality of data lanes of the network interface device,
  - connect the second computing device to a second subset of data lanes of the plurality of data lanes of the network interface device, and
  - manage operation of the network interface device based on instructions received from the first computing device;
- wherein the first computing device is to transmit to the second computing device notifications related to operation of the network interface device.

13. A method of operating an electronic device connectable to a network interface device, the method comprising:
- by a first computing device connected to a first subset of a plurality of data lanes of the network interface device, managing operation of the network interface device on behalf of a second computing device connected to a second subset of the plurality of data lanes of the network interface device; and
- by the first computing device:
  - receiving a request related to management of the network interface device from the second computing device;
  - based on a set of rules, determining whether or not the request is valid; and
  - if it is determined that the request is valid, managing operation of the network interface device on behalf of the second computing device based on the request.

14. The method of claim 13, the method comprising, by the first computing device:
- if it is determined that the request is not valid:
  - denying the request; and
  - transmitting a respective notification to the second computing device.

15. The method of claim 13, comprising, by the first computing device, managing operation of the network interface device on its own behalf.

16. A method of operating an electronic device connectable to a network interface device, the method comprising:
- by a first computing device connected to a first subset of a plurality of data lanes of the network interface device, managing operation of the network interface device on behalf of a second computing device connected to a second subset of the plurality of data lanes of the network interface device; and
- by the first computing device, transmitting to the second computing device notifications related to operation of the network interface device.

* * * * *